May 26, 1942. N. E. BERRY 2,284,033
PROCESS OF TREATING GREEN COFFEE
Filed Sept. 9, 1941
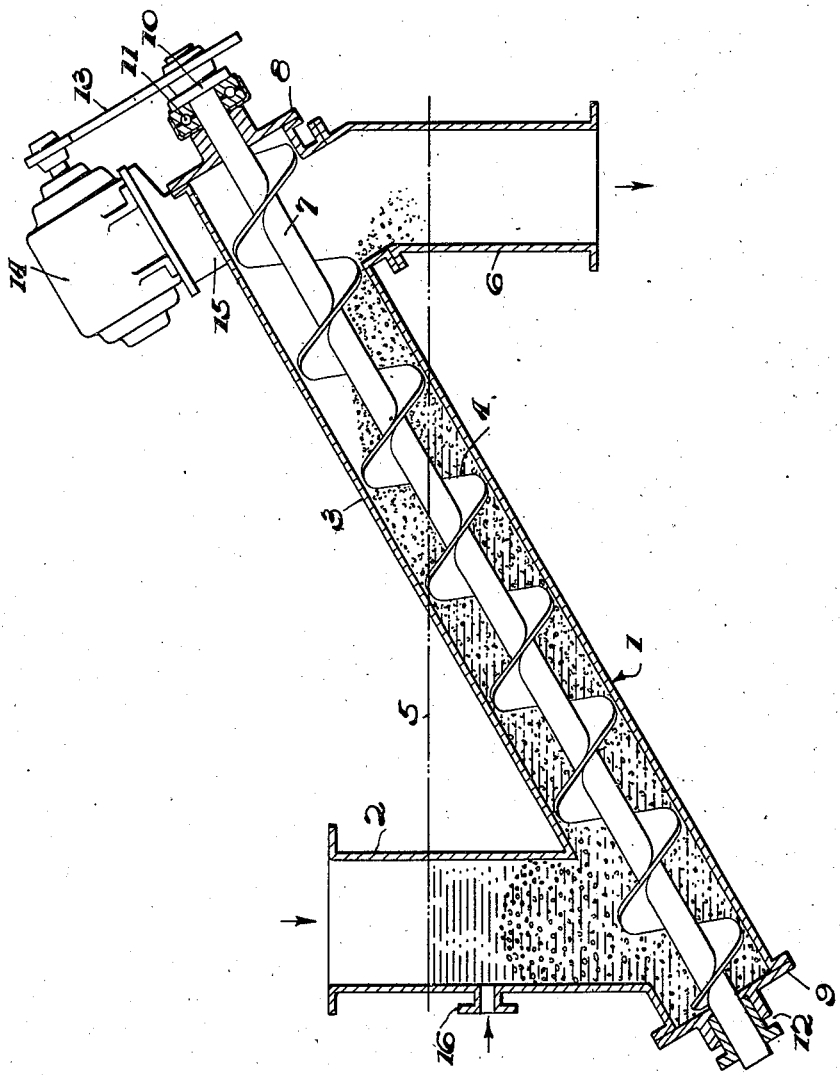
Inventor
Norton E. Berry.
By Cameron, Kerkam + Sutton
Attorneys Patented May 26, 1942

2,284,033

UNITED STATES PATENT OFFICE 2,284,033

PROCESS OF TREATING GREEN COFFEE

Norton E. Berry, Summit, N. J., assignor to General Foods Corporation, New York, N. Y., a corporation of Delaware Application September 9, 1941, Serial No. 410,221

5 Claims. (Cl. 99—69)

This invention relates to the preparation of green coffee beans for solvent extraction of caffein therefrom.

It is known that the extraction of caffein from green coffee beans by organic solvents is facilitated by substantially increasing their moisture content prior to extraction, but there have been substantial practical objections to the methods heretofore employed to accomplish this result. Steaming the beans results in uniform moisture absorption until they reach the temperature of the steam, but the moisture level so produced (approximately 17% for atmospheric steam) is not as high as desired, and further increase of moisture content by this method is impracticable because the rate at which the beans can absorb further moisture from steam alone is necessarily extremely slow since the steam no longer condenses at their surfaces. On the other hand, while the desirable high moisture content (for example, 30% to 40%) can be obtained by adding water to the beans, either in addition to or substitution for steaming, it has been necessary heretofore to calculate the amount of water so that it has been entirely absorbed by the beans in order to avoid the extraction and loss of desirable water-soluble substances other than caffein which are naturally present in the beans. The amount of water being thus limited, it has been practically impossible to secure a uniform increase of moisture throughout all beans, and since beans low in moisture take much longer to extract, the whole extraction process has been slowed down in order to obtain uniformly and completely extracted beans.

Accordingly one of the objects of the invention is to obtain uniformity of increase of the moisture content of the beans to whatever high moisture value may be desired for extraction in order to facilitate and expedite the extraction operation and insure uniformly extracted beans.

Another object is to obtain uniform high moisture values without loss of water-soluble substances from the beans.

A further object is to obtain uniform high moisture values in a minimum of time.

I attain the foregoing objects by immersing the beans for a definite period of time in an excess quantity of an aqueous solution of coffee solubles while maintaining conditions such that no solubles are lost from the beans to the solution. By using an excess quantity of the solution, I eliminate the difficulties heretofore experienced with limited quantities of water and obtain both rapid and uniform increase of moisture content of all beans to any desired high value, the amount of increase depending on the time of immersion. At the same time, a dynamic equilibrium is established between the water-solubles in the solution and the water solubles in solution in the beans preventing loss of solubles from the beans. I have found that because of the comparatively short period of immersion required to obtain the desired increase of moisture in the beans, the concentration of water solubles required in the solution to bring about this equilibrium is considerably less at all times than the concentration of water solubles in solution in the beans. There may be some interchange of solubles during treatment between the beans and the surrounding solution, but the amount of solubles thus removed from the beans is eventually balanced by the amount of solubles returned to the beans by their absorption of the surrounding solution.

The amount of solution should be sufficient to insure complete immersion of the beans throughout the duration of their treatment in the solution, it being evident that the proportion of solution to beans may be varied as desired provided only that this requirement is observed. Also the solution once made up may be used over and over again as long as desired by merely adding enough pure water to make up for the amount of water absorbed and carried away by the beans, and hence it is possible to operate continuously instead of in batches by passing the beans continuously through the solution and continuously adding make-up water at the same rate that water is carried away by the beans.

The solution may be made up initially in any suitable way, as by adding coffee water-solubles to water in an amount sufficient to provide the proper concentration in the solution. The latter will depend on the particular operating conditions adapted and can be determined by test or from experience. Preferably, however, I build up automatically the proper concentration of water-solubles in the solution from the beans initially treated. Thus water initially carrying no coffee solubles in solution will take up more and more solubles from the beans until the concentration reaches the equilibrium point, whatever it may be. Thereafter, so long as no solution is discarded, and provided the amount of make-up water is equal to the amount of water carried away by the beans, there can be no loss of water-solubles and the beans must enter and leave the solution with the same content of solubles.

The length of immersion of the beans at any given temperature of the solution determines the amount of increase of their moisture content, the time required to reach a desired moisture level decreasing as the temperature increases and temperatures from room temperature up to 212° F. being suitable. For example, at 146° F. a period of about thirteen minutes is required to bring beans of normal low moisture content to a 35% moisture level. Following their immersion, the beans are drained and if necessary tempered for a period sufficient to allow all clinging moisture to soak into the beans. The solution drained from the beans is preferably returned to the original solution as part of the make-up water in order to prevent loss of water-solubles.

Numerous forms of apparatus are suitable for either batch or continuous treatment of the beans and the accompanying schematic drawing shows only one form adapted for continuous operation. Hence it will be understood that the particular apparatus illustrated is not to be construed as limiting the scope of the invention, reference being had for this purpose to the appended claims.

Referring to the drawing, the vessel 1 comprises a vertical section 2, and an inclined section 3 provided with a screw 4, the sections 2 and 3 containing solution up to a common level 5. Beans are continuously introduced in any suitable manner into the vertical section 2, conveyed upwardly through section 3, and discharged through a chute 6. The screw shaft 7 rotates in bearings in closure plates 8 and 9 at the top and bottom ends respectively of section 3, the upper end of the shaft having a collar 10 cooperating with a thrust bearing 11 and its lower end being sealed by a gland 12. The shaft 7 may be driven in any suitable manner as by reduction gearing 13 and an electric motor 14 mounted on frame 15 carried by the section 3. Make-up water is continuously added to the vessel through a pipe 16 in an amount equal to the amount carried away by the beans so that the solution level 5 is maintained. As shown, the chute 6 is located some distance above the level 5 to provide a period for draining the beans prior to their discharge from the vessel which may also be sufficient for all clinging water to soak into the beans so that subsequent tempering is unnecessary.

Since the entire surface area of each bean is in contact with an excess of solution for the same length of time, the beans each absorb substantially the same amount of water from the solution, and also absorb water at a rapid rate and reach the desired high moisture level in a comparatively short time. The amount of moisture absorbed depends on the time of immersion and can be regulated by adjusting the speed of the screw 4. Also the solution may be heated in any suitable manner, as by steam jackets, in which case the shorter period of immersion required can be obtained by speeding up the screw. At all times, however, a dynamic equilibrium is maintained between the solubles in the solution and the solubles inside the beans so that no solubles are lost from the beans during their passage through the solution.

It will be understood that the invention is susceptible of a variety of embodiments, whether batch or continuous operation is employed, and may be practiced in any suitable apparatus so that the foregoing detailed description and examples are not to be construed as a definition of the limits of the invention, reference being had to the appended claims for this purpose.

What is claimed is:

1. The method of preparing green coffee beans for solvent extraction of caffein therefrom which comprises immersing the beans in an aqueous solution of coffee water solubles for a period sufficient to cause the absorption of a desired amount of moisture by the beans, said solution being used in amount sufficient to insure complete immersion of the beans throughout their period of treatment therein and containing coffee water solubles in dynamic equilibrium concentration with the water solubles in solution in the beans.

2. The method of preparing green coffee beans for solvent extraction of caffein therefrom which comprises immersing the beans in an aqueous solution of coffee water solubles for a period sufficient to cause the absorption of a desired amount of moisture by the beans, said solution being used in amount sufficient to insure complete immersion of the beans throughout their period of treatment therein and containing coffee water solubles in dynamic equilibirium concentration with the water solubles in solution in the beans and adding water to said solution in an amount equal to that carried away by the beans.

3. The method of preparing green coffee beans for solvent extraction of caffein therefrom which comprises immersing the beans in an aqueous solution of coffee water solubles for a period sufficient to cause the absorption of a desired amount of moisture by the beans, said solution being used in amount sufficient to insure complete immersion of the beans throughout their period of treatment therein and containing coffee water solubles in dynamic equilibrium concentration with the water solubles in solution in the beans adding liquid to said solution in an amount equal to that carried away by the beans, said liquid comprising in part added water and in part solution drained from the treated beans.

4. The method of preparing green coffee beans for solvent extraction of caffein therefrom which comprises continuously passing the beans through an aqueous solution of coffee water-solubles at a rate providing a period of immersion sufficient to cause the absorption of a desired amount of moisture by the beans, said solution containing coffee water solubles in dynamic equilibrium concentration with the water solubles in solution in the beans, and continuously adding water to said solution in an amount equal to that carried away by the beans to maintain a substantially constant volume of solution and a substantially constant concentration of coffee water solubles in said solution.

5. The method of preparing green coffee beans for solvent extraction of caffein therefrom which comprises continuously passing the beans through an aqueous solution of coffee water solubles at a rate providing a period of immersion sufficient to cause the absorption of a desired amount of moisture by the beans, said solution containing coffee water solubles in dynamic equilibrium concentration with the water solubles in solution in the beans, and continuously adding liquid to said solution in an amount equal to that carried away by the beans to maintain a substantially constant volume of solution and a substantially constant concentration of coffee water solubles in said solution, said liquid comprising in part added water and in part solution drained from the treated beans.

NORTON E. BERRY.